Dec. 31, 1940.   B. C. KEMPSON   2,226,821
REMOTE CONTROL
Filed April 3, 1939   3 Sheets-Sheet 1

INVENTOR
B. C. KEMPSON,
BY Charles L. Reynolds
ATTORNEY

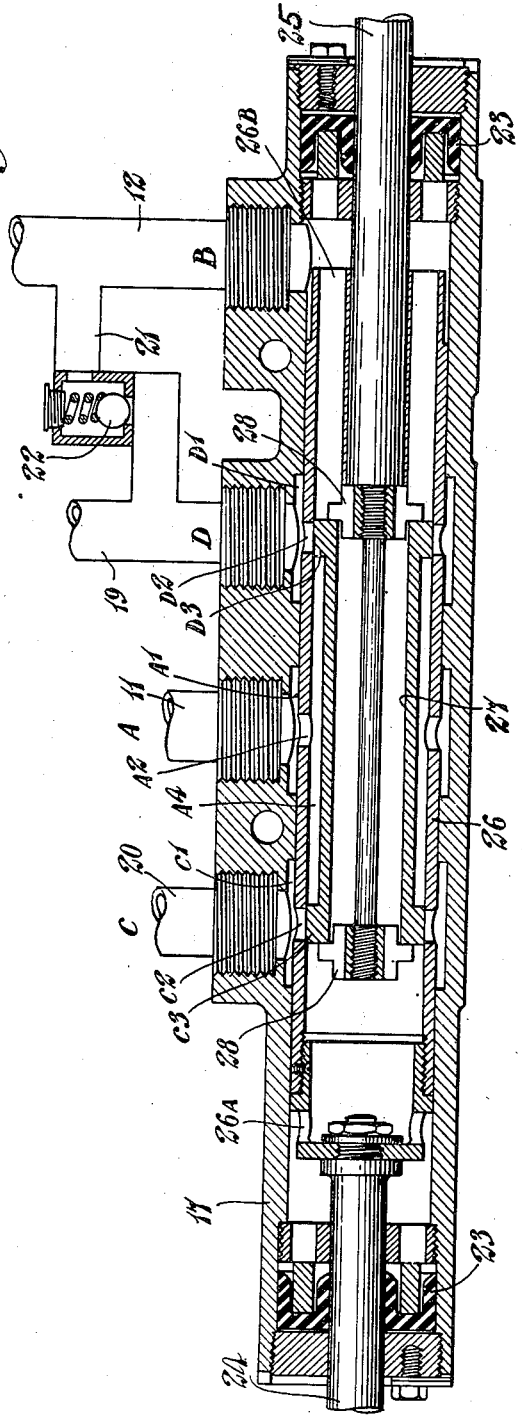

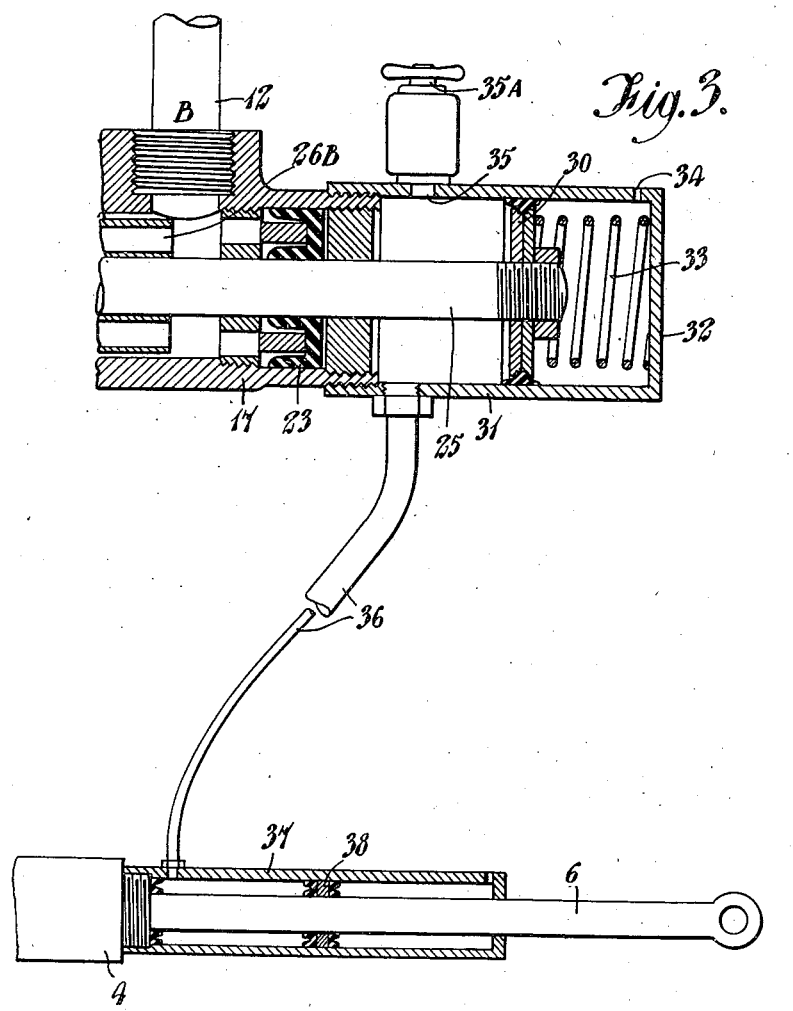

Patented Dec. 31, 1940

2,226,821

UNITED STATES PATENT OFFICE 2,226,821

REMOTE CONTROL

Bertram Carl Kempson, Cheltenham, England, assignor to Aircraft Components Limited, Cheltenham, England, a British company Application April 3, 1939, Serial No. 265,848
In Great Britain March 22, 1938

7 Claims. (Cl. 244—42)

This invention relates to aircraft hydraulic flap control systems.

The primary object of the invention is to afford a control mechanism or system in which the required movement is effected from a source of hydraulic power wherein a supply of fluid under pressure is continuously available, and in which the flap or other object to be moved is required to be settable in a position determinable by the setting of a hand lever or the equivalent; whilst remaining yieldable under overload conditions and being able automatically to return to the set position upon cessation of the conditions of overload.

According to the present invention, an aircraft hydraulic flap control system for actuating a double ended flap-operating jack, so as to move the flap angularly in each direction in accordance with a selected position and movement of a control lever or equivalent, includes a control valve element movable by said lever to place one end or the other of the jack in communication with such a source of hydraulic pressure, and a follow-up valve element moved in accordance with movement of the flap jack to cut off such communication when the selected position of the flap is reached, and wherein a pressure relief valve located in the hydraulic system limits the flap to yield angularly in one direction only, on overload, whilst on removal of that overload the flap returns to the selected position as determined by the control lever setting.

Figure 2 shows in section, the valve arrangement, some connections being indicated diagrammatically; and Figure 3 illustrates diagrammatically a variation applicable to the arrangement of Figure 1 and involving a modification of the structure of the valve of Figure 2.

Figure 1:
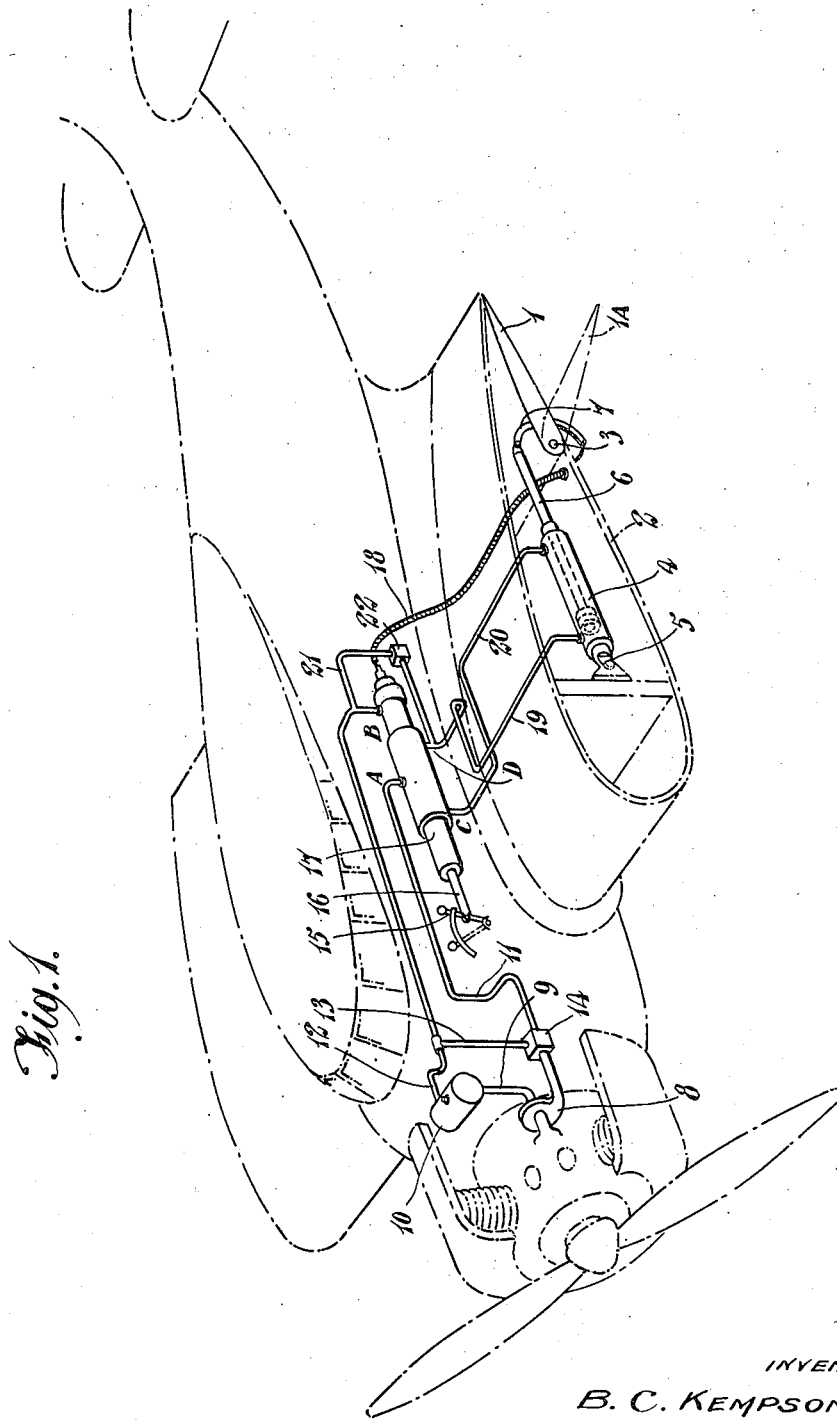
Figure 1 is an illustrative diagram in perspective, showing an arrangement in an imaginary aircraft, of a flap control system in accordance with the present invention. In this diagram the valve device, the jack, and the hydraulic system, make no pretence to being in appropriate proportions, but are drawn for clarity.

It will be found convenient first of all to refer to Figure 1 for an understanding of the general layout. In this figure, there is indicated a wing flap 1, hinged to a wing 2 on a hinge at 3. The flap 1 is operated by a double-acting hydraulic jack 4, pivotally mounted at 5 in the structure of the wing 2, the connecting rod 6 of the jack being pivoted to a lever or horn 7 of the flap, so that extension of the jack depresses the flap.

The aircraft has an engine-driven hydraulic pump at 8 (or equivalent source of hydraulic fluid under pressure, continuously available), fed by a pipe 9 from a reservoir 10. The pump delivers by a pipe 11, and return flow to the reservoir is by a pipe 12. Pipes 11, 12, are interconnected by a by-pass pipe 13, flow through which is controlled by an automatic by-passing valve 14 whenever the delivery through pipe 11 builds up a certain pressure, e. g. because the receiver or jack 4 has reached a limit of its travel. The system so far indicated is of a well known and well understood character. The pipes 11, 12 may likewise be connected, through one or more selector valves, to various other receivers (not shown), such as jacks for undercarriage retraction, radiator retraction, flaps, and for the operation of other auxiliary services. The pump and reservoir, and the by-pass arrangement, form in effect the basis of a continuously available source of liquid pressure, which can be diverted as required to one or more receivers, and the effective direction of which in reference to any particular receiver, can be reversed by suitable valve means. At present however, we are only concerned with the particular requirement, that such a system should be employed to operate and include a double-acting receiver (the jack 4) in a manner which is selective both as to position and sense of movement, in accordance with the position and sense of movement of a control lever or equivalent. Such a lever is indicated at 15; it is connected by a rod 16 to a valve device of which the stationarily mounted body is shown at 17. The valve device is also connected by a push-pull control, such as the mechanical connection diagrammatically indicated at 18, to the flap 1.

The body 17 has four liquid connections A, B, C, D. The pipe 11 is connected at A; the pipe 12 at B; a pipe 19 to the jack 4 is connected to D; and a pipe 20 extends from the jack to C. The pipe 19 is that which, when connected to the positive pressure supply pipe 11, actuates the jack 4 to depress the flap 1. The pipe 19 is connected across to the pipe 12 by a relief pipe 21 in which is provided a non-return, preferably adjustably loaded, relief valve of any suitable type, indicated at 22, arranged so as to open and relieve pressure in the pipe 19 in the event that some externally applied overload is imposed on the jack, the case contemplated being that of an aerodynamic overload tending to blow the flap 1 up, from a down position. It is not suggested that there is any novelty in the provision per se of a non-return relief valve such as 22 to look after such overloads, it being quite a common suggestion. It is believed, however, that it is novel to make such provision and to retain the property that the flap will return to the preselected position from which the overload moved it, when the overload conditions cease to be operative. The pipe 20 is that which, when in communication with the positive pressure line 11, positively moves the flap upwardly.

The system illustrated in Figure 1, with the valve device described hereafter, enables the flap 1 to be moved up into its low-drag position, or down into its high-lift position, or left in a selected intermediate position (except if forced up by overload) in accordance with movements back or forward or the position of rest, of the lever 15.

Whilst the elements have been shown separated and connected up in a somewhat impracticable manner, this is only to enable their relationships to be easily understood; in practice they may be arranged quite differently, for example the valve body 17 may be close to or even built as a unit with the jack 4, and the control connection 18 may be picked up directly off the rod 6 or an axial extension thereof projecting from the forward end of the jack.

Turning now to Figure 2, the valve device will be described in some detail. The body 17 is of generally cylindrical form and is provided at its ends with glands 23 in which slide two rods 24, 24. Rod 24 corresponds to rod 16 of Figure 1, and rod 25 to the control element 18 of Figure 1. The body 17 has four pipe connections, A, B, C, D for connection as in Figure 1, and of these A, C, D open inwardly of the body 17, into annular clearance spaces $A^1$, $C^1$, $D^1$, whilst B opens into one end of the interior bore of the body. The clearance spaces $A^1$, $C^1$, $D^1$, are of equal axial length and are uniformly spaced axially.

Within the body 17 is slidably fitted a first sleeve valve element 26 which is rigidly attached at one end to the rod 24 by which it is movable. This sleeve has three, (or three rings of) ports $A^2$ $C^2$ $D^2$ which are always open to the spaces $A^1$ $C^1$ $D^1$ respectively. The ends of the sleeve are open to the bore of the body at $26^A$, $26^B$. There is sufficient axial clearance within the bore, for the sleeve 26 to slide so that its ports traverse the length of the corresponding spaces but are not obturated by passing away from them. The sleeve 26, at its ends, is reduced in radius as shown to afford clearance for liquid passage.

Within the sleeve 26 is a second, follow-up, valve element 27, in the form of a hollow element attached to the rod 25 by fittings 28 which provide openings for the passage of liquid through the hollow, axially, thus affording interconnection between the two ends of the bore of the body 17. The element 27 has radially extending lands or cylindrical flanges $C^3$ and $D^3$, between which is left clearance space $A^4$ which is always open to A, so that it is convenient to regard it as a positive pressure space always supplied by the pressure source (the pump 8 of Figure 1). The lands $C^3$, $D^3$, are of slightly greater axial dimensions than the ports $C^2$, $D^2$, so that, when registering, these ports are both closed at one time by the respective lands. The second valve element 27 has sufficient axial clearance with regard to the sleeve 26, to ensure that whatever may be the axial position of the sleeve 26 the element 27 has an unobstructed scope of travel available to it, equal at least to the total available length of travel of the sleeve 26. Thus even if sleeve 26 is to the extreme right, element 27 can be to its extreme left. The relevant clearance is that which is afforded between the left or inner end of the assembly which includes the second element 27, and the left end of the interior of the assembly of the sleeve 26 and rod 24. As drawn, the two valve elements are shown in mid-position corresponding to flaps half depressed, as at 1A of Figure 1.

The function of this two-sleeve valve device, in relation to the system of Figure 1, is as follows.

From the position shown, assume that the pilot or other operator desires to extend the flap 1 fully. He moves his lever 15 from its mid-position to its extreme left-handed or forward position. This moves rod 24 and sleeve 26 fully to the left in Figure 2. By thus moving $C^2$ to the left, relative to the land $C^3$, and the opening $D^2$ to the left relative to the land $D^3$, two independent liquid passages are opened. The passage A, $A^1$, $A^2$, $A^4$, $D^2$, $D^1$, and D is opened, and affords a passage whereby fluid from the pump, by way of the pipe 11, may pass through the valve body 17 and by way of the pipe 19 to the left-hand end of the jack 4, tending to depress the flap 1. The second passage thus opened simultaneously, C, $C^1$, $C^2$, to the interior of the sleeves 27 and 26, and thence by 26B to the port B, permits fluid which is contained in the right-hand end of jack 4 to pass by way of the pipe 20 and valve body 17 back to the low pressure side of the hydraulic system, for instance, to the reservoir 10.

As soon as the flap 1 moves downward, which usually follows immediately the movement of the sleeve 26, as described above, movement of the flap is transmitted to rod 25 and to sleeve 27 by means of the connection at 18, causing the sleeve 27 to move to the left, following up the sleeve 26. Disregarding slack in the connections, any compressibility of fluids, and like negligible factors, the initiating movement of sleeve 26 and the follow-up movement of sleeve 27 are nearly simultaneous. When the sleeve 27 has moved the same distance as that traveled previously by the sleeve 26, the land $D^3$ again closes the port $D^2$, and the land $C^3$ again closes the port $C^2$, preventing further flow from the pump to the jack, or from the opposite end of the jack to the reservoir.

Now, if the operator desires to raise the flap 1, he moves the lever 15 backwards, to the right. This moves the sleeve 26 to the right and opens channels for liquid, viz: pipe 11, A, $A^1$, $A^2$, $A^4$, $C^2$, $C^1$, C, pipe 20; and pipe 19, D, $D^1$, $D^2$, 26B, B, pipe 12. The positive pump pressure is thus applied to the rear, right, or "up" side of the jack 4, whilst the left or idle side is opened to reservoir.

Suppose now the flap 1 is half down and the valve positioned as in Figure 2, and an excess of speed causes excessive aerodynamic load on the flap. This results in pressure being created in pipe 19 sufficient to open relief valve 22, so that the displaced liquid can pass through pipes 21, 12 and return to reservoir. But this is necessarily accompanied by upward flap movement, which results in movement of the element 27 to the right. The lands $C^3$ $D^3$ therefore open the corresponding ports. There are therefore established the same two channels as if the sleeve 26 had been moved to the left (see back to first example). The idle end of the jack in this condition is the right hand end, which if liquid were not admitted to it, would "wiredraw;" the pipe 20 connects to this end. However, this end is now open to reservoir, via 20, C, $C^1$, $C^2$, the interior of sleeve 27, 26B, B, and 12, or if it be convenient so to regard it, is fed by the liquid which is passed from the jack through the valve 22 by reason of the overload which fed-back liquid can reach the jack through the ports and passages mentioned of the valve device. So the jack and its pipes are kept full, the two sides of the jack being in effect short-circuited. Simultaneously, of course, the positive pressure in $A^4$ is now open through $D^2$ to pipe 19, and the pressure due to flap overload being assumed to be greater than the delivery pressure of the pump, there will be no flow from the pump, which will either fail to deliver or will contrive to deliver through by-pass 13, the flow therethrough possibly (depending on the nature of the valve at 14) being augmented by back flow through the pipe 11. It is, for the purpose of the invention, immaterial what exactly takes place because there is always accommodation for the displaced liquid from the jack, in one way or another.

When the overload condition ceases, the valve 22 closes again, and the pump-pressure is again reasserted in the pipe 19, depressing the flap to the position whence it came, as ordained by the unchanged position of the sleeve 26.

It will now have been appreciated that the valve device governs the flap selectively as to position, or sense of movement, in accordance with the position, or sense of movement, of the lever 15; and in so doing acts as a reversing-valve; and it also permits the flap to move by overload and causes it to return to preselected position when overload ceases to exist; and performs these duties with special regard to the fact that the receiver, viz. the jack 4, is a double-acting receiver which consequently requires to have both of its sides opened for liquid flow, in the appropriate sense, whenever it is to move or be moved.

In Figure 3 a variation is illustrated which should be studied in relation to Figures 1 and 2. Its main object is to enable three pipelines to be used instead of the two pipelines 19, 20, and the the mechanical control 18. This may be a convenience from the installation point of view, and may also obviate difficulties arising out of slackening, or wear, or thermal changes, in the mechanical control. Further, it affords a ready means for adjusting the phase relationship in the follow-up part of the system.

There is shown in Figure 3 sufficient of the valve body 17 and associated parts, for their recognition from Figure 2. There is also shown, out of scale, part of the jack 4. Instead of the rod 25 being connected to a mechanical control such as 18, its outer end carries a piston 30, working in a cylinder 31 which is mounted on the body 17, coaxially with the rod 25. The piston 30 works as a single-acting piston but is preferably made as a double-acting one to reduce the possibility of air passing it if suction should occur. Between the piston 30 and the closed outer end 32 of the cylinder 31 is a light compression spring 33, sufficiently strong for its purpose which will be readily understood. The spring occupied space of the cylinder 31 is open to atmosphere by a hole 34. The pressure space, on the other side of the piston 30 is occupied by liquid, and is connected at 35 to a small header chamber with a screw hand-adjustable plunger 35A therein. A pipe 36 connects the pressure space of cylinder 31 to the corresponding space in a cylinder 37 mounted on the cylinder of the jack 4, the rod 6 of which carries a piston 38 therein. The volumetric displacement due to the piston 38 is matched with that of piston 30 in the ratio in which it is desired that the movements of the rod 25 should bear to the movements of the rod 6. The pressure spaces and the pipe 36 are of course completely filled with liquid. Whenever the rod 6 moves to the left the piston 38 displaces liquid, urging the piston 30 to the right, whereby the follow-up valve element in the body 17 is moved to the right in the desired ratio. Whenever rod 6 moves to the right, the spring 33 and atmospheric pressure, cause return displacement. Thus the pipe 36 forms, in effect, a hydraulic bond which is the equivalent of the control connections 18. It goes without saying that the sense of movement is arranged to be appropriate (it could be changed by connecting the pipe 36 to the alternative end of the cylinder 37). If the plunger 35A is screwed down or up, by hand or by automatic—perhaps thermo-responsive—means, more or less liquid will occupy the hydraulic space, and consequently the exact relationship between the positions of pistons 30 and 38 can be adjusted readily and quickly, and slight leakage losses or thermal changes can be met.

What I claim is:

1. In an hydraulic control system which includes a pressure source, a double-acting jack, and conduits connecting the same, means to control operation of the jack, as to position and sense, comprising a manual control element movable in either direction between two limiting positions corresponding to the two limit positions of the jack, a first valve element movable under the influence of and in accordance with the movement of the manual control element, to place one or the other side of the jack in communication with the pressure source and simultaneously to vent the opposite side of the jack, thus to initiate its movement in the corresponding sense, a second valve element movable under the influence of and in accordance with the movement of the jack, and cooperating with the first valve element to cut off such communications when the second valve element, through movement of the jack, has moved through a distance equivalent to the movement of the first valve element, and a valved by-pass connection between one such pressure connection to the jack, only, and the vent, normally closed but arranged to open upon the occurrence of a pressure in such jack connection which is in excess of normal operating pressures.

2. In an airplane, in combination with the sustaining wings, a wing flap pivotally mounted thereon, and an hydraulic system including a continuously driven pump, a double-acting jack operatively connected to the flap, and conduits connecting the pump and jack, means to control operation of the jack for positive extension or retraction of the flap, and to hold the flap in any extended position, comprising a manual control element movable in either direction and by any amount between two limiting positions corresponding to "flap up" or "flap down" limit positions, a first valve element connected for movement only under the influence of and to an extent dependent upon the movement of the manual control element, to place one side or the other of the jack in communication with the high pressure side of the hydraulic system and simultaneously to place the opposite side of the jack in communication with the low pressure side of the hydraulic system, thus to initiate movement of the jack and flap in the corresponding sense, and a second valve element connected for movement only under the influence of and in accordance with the movement of the jack and flap, and cooperating with the first valve element to cut off such communications when the second valve element, through movement of the jack and flap, has moved through a distance equivalent to the movement of the first valve element, a by-pass connecting the "down flap" pressure conduit and the low pressure side of the system, and a spring-loaded non-return valve in said by-pass, openable at a predetermined pressure in excess of normal flap-down-swinging pressure, under the influence of excessive aerodynamic reaction upon a down flap, thereby to permit upward movement of the flap and corresponding movement of the flap-controlled second valve element, relative to the unmoved first valve element, in retracting which movement, after elimination of the excessive aerodynamic reaction upon the flap, the valve elements resume their initial relative positions, corresponding to the position of the unmoved manual control element.

3. In an airplane, in combination with the fuselage and the sustaining wing, a wing flap carried by the wing and capable of being withdrawn upward into a low-drag position, means to move the flap at will downward into a plurality of successively higher-lift positions, said means including a continuously available source of fluid under pressure, a low pressure return line, a double-acting jack operatively connected to the flap to move the flap between any two positions and in either direction, a pilot's control shiftable between positions corresponding to the flap's set position and any desired new position, and valve means to control communication between the pressure source and the jack, said valve means comprising a hollow valve body having one port connecting at all times with its interior and connected to the low pressure return line, a second port connected to the pressure source, and two additional ports connected to the respective ends of the jack, and when in communication with the pressure source acting, the one to move the flap up and the other to move the flap down, a by-pass connecting the low pressure return line with the flap-down connection, and a by-pass valve therein normally closed but yieldable upon the occurrence of an overload reacting through the flap-down end or connections of the jack, said valve means further including means within the valve body normally blocking communication between the pressure port and the flap-up and flap-down ports, and between both of the jack-connected ports and the low pressure port, but operatively connected to the pilot's control for shifting thereby to afford communication between the pressure port and either the flap-up or the flap-down port, and simultaneously between the low pressure port and the other jack-connected port, and further means within the valve body, operatively connected for movement by and in accordance with movement of the flap, to follow up and close automatically those ports which were opened by movement of the pilot-operated means, when the flap has moved in correspondence with movement of the pilot operated means.

4. In an airplane, in combination with a wing flap settable in various positions between low drag and high lift limit positions, and with pilot-operated means settable in corresponding positions, an hydraulic control system connecting the pilot-operated means and the flap, to move the latter from one set position to another, to stop and hold it in any set position in accordance with the set position of the pilot-operated means, and to permit yielding of the flap when overloaded and to return the flap to the preset position upon the removal of the overload, said hydraulic system comprising a jack operatively connected to move the flap, a constantly available pressure fluid source and a low pressure return line, conduits connecting the pressure source and the low pressure line with the jack, a control valve element movable by the pilot-operated means, and interposed in said conduits to place the jack in communication with the pressure source, a follow-up valve element movable in accordance with the flap to cut off such communication when the selected position of the flap is reached, and a pressure relief valve in the hydraulic system arranged to open to permit the flap to yield on overload only, and thereby to move the follow-up valve element relative to the previously set control valve element, whilst closing on removal of the overload to permit the flap and the follow-up valve element each to return to its previously set position and relationship.

5. The combination of claim 4, wherein the jack is of the double-acting kind, and wherein the control valve element and the follow-up valve element are relatively so arranged that establishment of pressure between the pressure source and one side of the jack serves simultaneously to connect the opposite side of the jack with the low pressure return line.

6. The combination of claim 4, wherein the connection between the jack and the follow-up valve element comprises a pair of piston and cylinder arrangements, one connected and movable with the jack, and the other with the follow-up valve element, and a fluid line connecting the two for conjoint movement in each direction.

7. The combination of claim 4, wherein the connection between the jack and the follow-up valve element comprises a pair of piston and cylinder arrangements, one connected and movable with the jack, and the other with the follow-up valve element, a fluid line connecting the two for conjoint movement in each direction, and means to vary the amount of fluid in the latter system, thereby to adjust the relative positions of the pistons, each in its cylinder.

BERTRAM CARL KEMPSON.